(12) United States Patent
Tanaka (10) Patent No.: US 8,326,687 B2
(45) Date of Patent: Dec. 4, 2012

(54) ADVERTISEMENT DISPLAY SYSTEM

(76) Inventor: Shinichi Tanaka, Kanagawa (JP)

( * ) Notice: Subject to any disclaimer, the term of this patent is extended or adjusted under 35 U.S.C. 154(b) by 0 days.

(21) Appl. No.: 12/682,806

(22) PCT Filed: Jul. 22, 2009

(86) PCT No.: PCT/JP2009/063446
§ 371 (c)(1),
(2), (4) Date: Apr. 13, 2010

(87) PCT Pub. No.: WO2010/134217
PCT Pub. Date: Nov. 25, 2010

(65) Prior Publication Data
US 2010/0299189 A1 Nov. 25, 2010

(30) Foreign Application Priority Data
May 21, 2009 (JP) .................. 2009-122766

(51) Int. Cl.
*G06Q 30/00* (2012.01)
(52) U.S. Cl. .................. 705/14.49; 705/14.4
(58) Field of Classification Search ............... 705/14.63, 705/14.1–14.73, 14.45, 14.5, 14.58
See application file for complete search history.

(56) References Cited

U.S. PATENT DOCUMENTS

| | | | |
|---|---|---|---|
| 5,917,431 A * | 6/1999 | Sanada et al. | 340/907 |
| 6,909,963 B1 * | 6/2005 | Ebert | 701/117 |
| 2006/0143082 A1 * | 6/2006 | Ebert | 705/14 |
| 2007/0063875 A1 * | 3/2007 | Hoffberg | 340/995.1 |

FOREIGN PATENT DOCUMENTS

| | | |
|---|---|---|
| JP | 06-139491 | 5/1994 |
| JP | 7-10016 | 2/1999 |
| JP | 2003-252153 | 9/2003 |
| JP | 2003-256987 | 9/2003 |
| JP | 2006-171831 | 6/2006 |
| JP | 2007-058296 | 3/2007 |
| JP | 2007-085777 | 4/2007 |
| JP | 2007-533025 | 11/2007 |
| KR | 10-0555000 | 2/2006 |

OTHER PUBLICATIONS

Korean Patent Decision mailed Jun. 28, 2010 in corresponding Korean Patent Application No. 10-2010-7006337 w/translation.

* cited by examiner

*Primary Examiner* — Scott D Gartland
(74) *Attorney, Agent, or Firm* — Wenderoth, Lind & Ponack, L.L.P.

(57) ABSTRACT

An advertisement display system includes a photograph unit for taking a photograph of a signal light of a signal 5 such as a traffic signal or an alarm for a railway crossing, a computer for analyzing the signal condition such as lighting or blinking of the signal light from image data thus photographed by the photograph unit, and a display unit for displaying advertisement display information which is stored in advance in the computer or the display unit in conjunction with the lighting or blinking condition of the signal light analyzed by the computer and displays a display body having a content correlated with the signal condition of the signal on the display unit.

4 Claims, 11 Drawing Sheets

Image data

Lit

Image data

Non-lit

Image data

Lit

ADVERTISEMENT DISPLAY SYSTEM

BACKGROUND OF THE INVENTION

1. Field of the Invention

The present invention relates to an advertisement display system which can switch displayed advertisement content by correlating the advertisement content with lighting or blinking condition of a signal such as a traffic signal or an alarm for a railway crossing.

2. Description of the Related Arts

Conventionally, it has been known that an advertisement which can be seen by the general public is displayed by way of a sign, a poster, or the like at a location which is facing a heavily-trafficked street where many vehicles or pedestrians pass by. At an intersection where a signal is provided, vehicles and pedestrians pass or stop in accordance with the traffic signal. Therefore there is a demand that an advertisement which can be understood within a short period of time is displayed for the drivers or pedestrians passing the way while on the other hand an advertisement which requires longer time is displayed to the drivers or pedestrians stopping. Therefore, there is a demand that an advertisement for the drivers or pedestrians passing by and an advertisement for the drivers or pedestrians waiting are switched to be displayed.

On the other hand, in a case where various types of advertisement information such as letters, graphics, or moving images are displayed publicly, there is a possibility that an eye-catching advertisement may attract drivers' or pedestrians' attention and cause danger to their driving or walking. Therefore, there is a demand that an advertisement is displayed while paying attention to safety of the drivers and pedestrians.

Due to such demands, an apparatus for switching a display body attached to a traffic signal in conjunction with the traffic signal has been invented. However, such apparatuses switch color or content of the display body such as a notice by synchronization with an electric signal from the traffic signal by connecting directly with the traffic signal by an electric cable or by attaching a photosensor or the like (Patent Documents 1 to 3). Here, a system for taking a photograph of outside of a vehicle by a photograph apparatus for the purpose of switching display on a monitor of a car navigation mounted in the vehicle has been invented (Patent Documents 4 and 5). Moreover, a system for controlling the traffic signal itself by inputting a signal using a digital camera shutter as a switch has been invented (Patent Document 6).

Patent Document 1: Japanese Unexamined Patent Application publication No. H6-139491
Patent Document 2: Unexamined Utility Model Application Publication No. H7-10016
Patent Document 3: Published Japanese translations of a PCT Application No. 2007-533025
Patent Document 4: Japanese Unexamined Patent Application Publication No. 2003-252153
Patent Document 5: Japanese Unexamined Patent Application Publication No. 2007-85777
Patent Document 6: Japanese Unexamined Patent Application Publication No. 2007-58296

These conventional apparatuses for switching the display body in conjunction with the traffic signal which are attached to the traffic signal cause synchronization between condition of the traffic signal and display of the display body by being directly connected with the traffic signal by an electric cable or by attaching a sensor to the traffic signal. However, the traffic signal or the alarm for a railway crossing actually does not include a system for supplying an electric signal for synchronization with the advertisement display system.

Moreover, it is difficult to connect an electric cable or to attach a sensor to the traffic signal or the alarm for a railway crossing for a commercial purpose from viewpoints of both safety of traffic and laws and regulations. Further, the conventional apparatus for switching the display body which is correlated with the traffic signal and attached to the traffic signal is synchronized with the traffic signal only to switch display such as a notice and is not for being correlated with the lighting or blinking of the traffic signal or the alarm for a railway crossing or forecasting the lighting or blinking of the traffic signal or the alarm for a railway crossing to precisely control the content of the displayed advertisement.

In consideration of the above, the present invention is aimed at providing an advertisement display system having a high advertising effectiveness which is correlated with the condition of the traffic signal or the alarm for a railway crossing to switch the advertisement content while paying sufficient attention to safety of the traffic.

SUMMARY OF THE INVENTION

An advertisement display system for achieving the above-mentioned purpose includes a means for taking a photograph of a signal light of a signal such as a traffic signal or an alarm for a railway crossing by a photograph unit, a means for detecting a signal condition from data thus taken by the photograph unit, and a means for displaying a display body having a content correlated with the signal condition of the signal on the display unit on the basis of the detection result.

An advertisement display system including a photograph unit enabled to communicate with a computer, the computer which can analyze the signal condition and control the advertisement display, and a display unit has a means for taking a photograph of a signal light of a signal such as a traffic signal or an alarm for a railway crossing by the photograph unit, an analysis means for analyzing the signal condition such as lighting or blinking of the signal light from image data thus photographed by the photograph unit by the computer, and a means for displaying an advertisement display information which is stored in advance in the computer or the display unit in conjunction with the lighting or blinking condition of the signal light analyzed by the analysis means and displays a display body having a content correlated with the signal condition of the signal on the display unit.

Moreover, the means for displaying the advertisement display information on the display unit extracts an advertisement display information having a pattern that is to be displayed from a plurality of patterns of advertisement display information stored in advance in the computer or the display unit on the basis of change in the signal condition analyzed by the analysis means and outputs the advertisement display information having the pattern thus extracted to the display unit.

Further, in the means for displaying the advertisement display information on the display unit, the means for extracting an advertisement display information having a pattern that is to be displayed from a plurality of patterns of advertisement display information stores advertisement display information, to which a flag correlated to the signal condition is supplied, in the computer or the display unit in advance and extracts an advertisement display information having a pattern to be displayed on the basis of the flag according to the signal condition.

The means for displaying the advertisement display information on the display unit outputs a switching signal for switching display of the advertisement display information having a plurality of patterns, which are stored in the display unit in advance, on the basis of change in the signal condition analyzed by the analysis means.

The advertisement display information having a plurality of patterns and stored in the computer or the display unit in advance is either advertisement content information or matrix information for controlling lighting of a lamp.

The analysis means for analyzing the lighting or blinking condition of the signal in the computer detects a color of the signal light which is being lit.

The analysis means for analyzing lighting or blinking condition of the signal analyzes which signal light of the signal lights in the image data is being lit on the basis of a position information format of each signal light of the signal which was loaded in the computer in advance.

The analysis means for analyzing the lighting or blinking condition of the signal compares the image data of the signal light in a first condition and the image data of the signal light in a second condition which were taken with a predetermined interval to judge which signal light is lit from the difference in positions of the signal light being lit between the image data.

The analysis means for analyzing the lighting or blinking condition of the signal analyzes whether there is a lit signal light or there is not a lit signal light (null) in the image data.

The means for analyzing the lighting or blinking condition of the signal forecast analyzes switching of the signal condition on the basis of a time format from start of lighting to end of lighting which was loaded in the computer in advance or a time format from start of lighting to end of lighting which was calculated from the lighting period of a signal light in the previous time cycle.

An advertisement display system including a photograph unit, an image display unit for displaying an image taken by the photograph unit, an optical sensor for detecting display condition of the image display unit, a relay unit connected to the sensor, and a display unit connected to the relay unit has a means for taking a photograph of a signal light of a signal such as a traffic signal or an alarm for a railway crossing by the photograph unit, a means for displaying the photographed image on the display unit, a means for detecting the signal condition of the signal light by the optical sensor from the image displayed on the image display unit, and a means for displaying an advertisement display information which is stored in advance in the display unit by the relay unit in conjunction with the signal condition of the signal light detected by the optical sensor, and displays the display body having a content correlated with the signal condition of the signal on the display unit.

The photograph unit is a digital camera or a video camera which can take a digital image.

The display unit is any one of an image display monitor, an electric display, a projector, a display unit having a sheet on which the display body is displayed and is supported to be enabled to slide to a frame shaped window, and a display unit which changes display content by rotating a polygonal column on which the display body is displayed.

Including the means for taking a photograph of a signal light of a signal such as a traffic signal or an alarm for a railway crossing by a photograph unit, the means for detecting a signal condition from data thus taken by the photograph unit, and the means for displaying a display body having a content correlated with the signal condition of the signal on the display unit on the basis of the detection result enables the system to effectively display an advertisement having a content, time, and amount of information correlated with the signal condition of the signal to a viewer and therefore it becomes possible to carry out advertisement display with high advertisement effectiveness. Moreover, display with smaller amount of information or display appropriate for traffic safety can be carried out for drivers or pedestrians passing while display with larger amount of information can be carried out to those who are waiting at the signal. Therefore, it becomes possible to carry out traffic safety-conscious advertisement display.

The advertisement display system of the present invention including a photograph unit enabled to communicate with a computer, a computer which can analyze the signal condition and control the advertisement display, and a display unit further has a means for taking a photograph of a signal light of a signal such as a traffic signal or an alarm for a railway crossing by the photograph unit, an analysis means for analyzing the signal condition such as lighting or blinking of the signal light from image data thus photographed by the photograph unit by the computer, and a means for displaying an advertisement display information, which is stored in advance in the computer or the display unit on the display unit, in conjunction with the lighting or blinking condition of the signal light analyzed by the analysis means, and displays a display body having a content correlated with the signal condition of the signal on the display unit. Thus, the system can effectively display an advertisement with content, time, and amount of information correlated with the signal condition of the signal with a relatively simple configuration to a viewer and carry out advertisement display with high advertisement effectiveness. Moreover, display with smaller amount of information or display appropriate for traffic safety can be carried out for drivers or pedestrians passing while display with larger amount of information can be carried out to those who are waiting at the signal. Therefore, it becomes possible to carry out traffic safety-conscious advertisement display.

Further, since the means for displaying the advertisement display information on the display unit extracts an advertisement display information having a pattern that is to be displayed from a plurality of patterns of advertisement display information stored in advance in the computer or the display unit on the basis of change in the signal condition analyzed by the analysis means and outputs the advertisement display information having the pattern thus extracted to the display unit, it becomes possible to prepare display of an advertisement with a plurality of contents and a plurality of time patterns or the like in advance so that display of the advertisement can be changed easily on the basis of change in the signal condition.

Further, since the means for extracting an advertisement display information having a pattern that is to be displayed from a plurality of patterns of advertisement display information in the means for displaying the advertisement display information on the display unit stores advertisement display information, to which a flag correlated to the signal condition is supplied, in the computer or the display unit in advance and extracts an advertisement display information having a pattern to be displayed on the basis of the flag according to the signal condition, it becomes possible to easily extract the advertisement display information to be displayed.

Since the means for displaying the advertisement display information on the display unit outputs a switching signal for switching display of the advertisement display information having a plurality of patterns, which are stored in the display unit in advance, on the basis of change in the signal condition analyzed by the analysis means, it becomes possible for the computer to output a switching signal so that the advertisement display information stored in the display unit can be easily switched.

Since the advertisement display information having a plurality of patterns stored in the computer or the display unit in advance is either advertisement display content information or matrix information for controlling lighting of a lamp, it becomes possible to carry out output corresponding to the display unit. In a case where the advertisement display information is the advertisement display content information, various information such as a moving image or a still image can be output. In a case where the advertisement display information is the matrix information for controlling lighting of a lamp, information can be output by a simple method such as outputting a textual information on an electric display.

Since the analysis means for analyzing the lighting or blinking condition of the signal in the computer is a means for detecting a color of the signal light which is lighting, it becomes possible to accurately analyze which one of green, yellow, and red or which one of green and red is lighting.

Since the analysis means for analyzing lighting or blinking condition of the signal analyzes which signal light of the signal lights in the image data is being lit on the basis of a position information format of each signal light of the signal which was loaded in the computer in advance, it becomes possible to accurately analyze which signal light of the green, yellow, and red of the traffic signal for a vehicle or which signal light of green and red of the traffic signal for a pedestrian is being lit.

Since the analysis means for analyzing lighting or blinking condition of the signal compares image data of the signal light in the first condition and the image data of the signal light in the second condition and analyzes which signal light of the signal lights in the image data is being lit on the basis of a difference in the positions of the signal lights being lit between two image data, the format information does not need to be stored. Therefore, amount of information stored in the computer becomes small and such analysis means is suitable for forecasting a third condition like forecasting a change to a red light and carrying out advertisement display control.

Since the analysis means for analyzing the lighting or blinking condition of the signal analyzes whether there is a lit signal light or there is not a lit light (null) in the image data, in a case where a lighting condition of a certain signal light is recognized, it is analyzed that the green light is lit while in a case where a lighting condition of the signal light is not recognized, it is analyzed that the red signal light it lit. In a case where lighting condition and non-lighting condition of a signal light are repeated in an image data taken with a short period of interval which is one second or less, it is analyzed that the green light is blinking. Therefore, it becomes possible to carry out analysis especially suitable for a signal for a pedestrian. Moreover, this is also suitable for analysis of a signal condition of an alarm for a railway crossing which indicates passing and not passing of a train by blinking and non-lighting of a red light.

Since the means for analyzing the lighting or blinking condition of the signal forecast analyzes switching of the signal condition on the basis of a time format from start of lighting to end of lighting which was loaded in the computer in advance or a time format from start of lighting to end of lighting which was calculated from the lighting period of a signal light in the previous time cycle, it becomes possible to carry out highly accurate and precise control of advertisement display such as prompting a driver to make a preparation by outputting "Signal turning to green light soon" on the display unit several seconds before the green light is lit at which the red light is being lit.

The advertisement display system including a photograph unit, an image display unit for displaying an image taken by the photograph unit, an optical sensor for detecting display condition of the image display unit, a relay unit connected to the sensor, and a display unit connected to the relay unit includes a means for taking a photograph of a signal light of a signal such as a traffic signal or an alarm for a railway crossing by the photograph unit, a means for displaying the image thus taken on the display unit, a means for detecting the signal condition of the signal light by the optical sensor from the image displayed on the image display unit, and a means for displaying an advertisement display information which is stored in advance in the display unit on the display unit by the relay unit in conjunction with the signal condition of the signal light detected by the optical sensor, and the system can effectively display on the display unit the display body having a content, time, and amount of information correlated with the signal condition of the signal to a viewer. Therefore it becomes possible to carry out advertisement display with high advertisement effectiveness by an easy configuration of the display unit, the sensor, and the relay unit without using a computer. Moreover, display with smaller amount of information or display appropriate for safe traffic can be carried out for drivers or pedestrians passing while display with larger amount of information can be carried out to those who are waiting at the signal. Therefore, it becomes possible to carry out traffic safety-conscious advertisement display.

Since the photograph unit is a digital camera or a video camera which can take a digital image, it becomes possible to take image data regarding the signal condition of the signal which can be easily analyzed.

Since the display unit is any one of an image display monitor, an electric display, a projector, a display unit having a sheet on which the display body is displayed and is supported to be enabled to slide to a frame shaped window, and a display unit which changes display content by rotating a polygonal column on which the display body is displayed, content of the advertisement display can be easily changed.

DESCRIPTION OF THE REFERENCE NUMERALS

1: Photograph unit;
2: Computer;

21: Database;
22: Line;
23: Line;
3: Display unit;
31: Display body;
4: Display unit;
41: Database;
5: Traffic signal;
51: Traffic signal for a vehicle;
52: Green light;
53: Yellow light;
54: Red light;
55: Traffic signal for a pedestrian;
56: Green light;
57: Red light;
6: Vehicle;
7: Pedestrian;
8: Intersection;
9: Building;
101: Image display unit;
102: Optical sensor;
103: Relay unit;
104: Cable;
105: Cable;
106: Screen;
107: Optical sensor part;
108: Shield material; and
109: Cable

DESCRIPTION OF THE PREFERRED EMBODIMENTS

Figure 1:
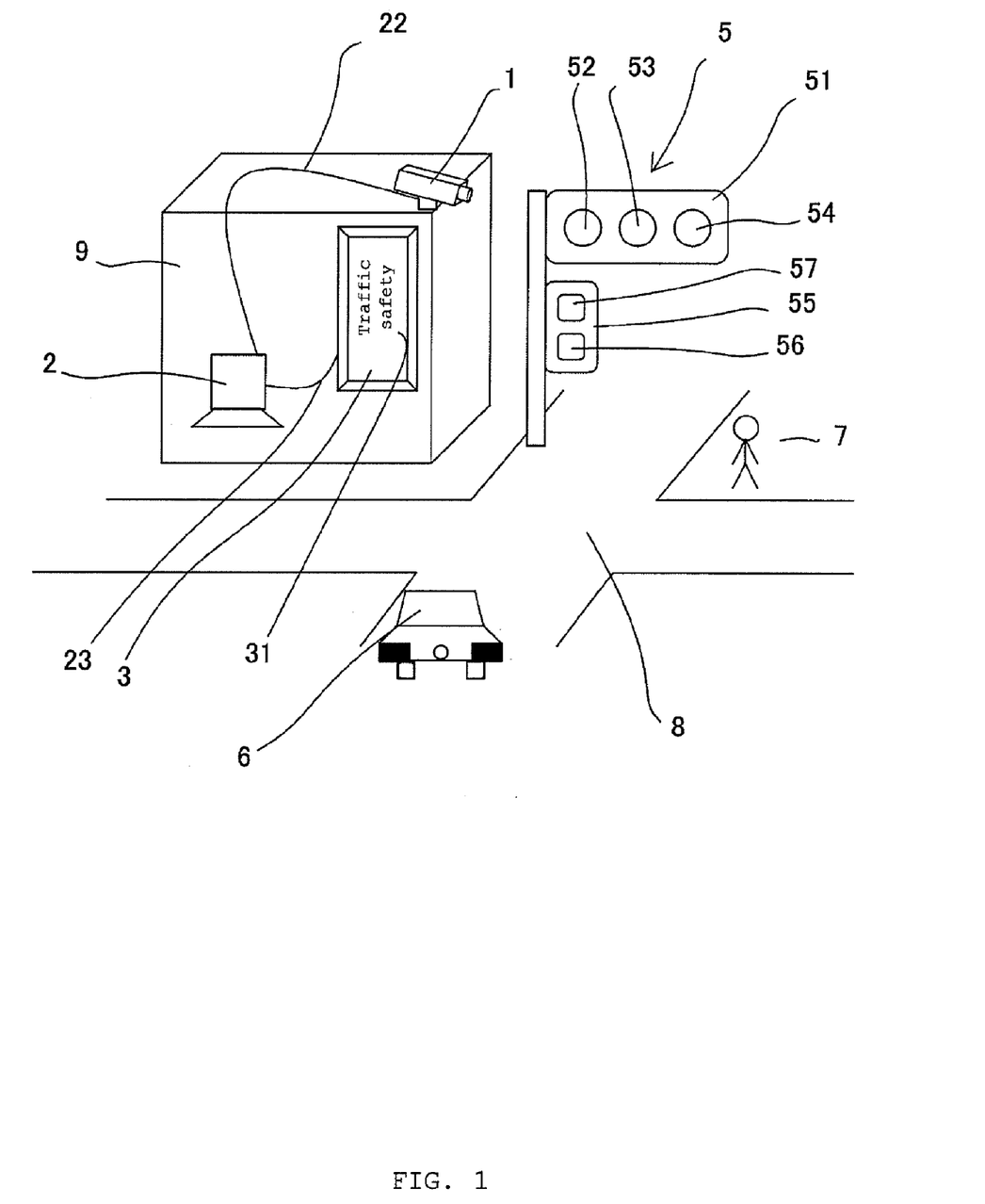
FIG. 1 A schematic view showing a usage condition of an advertisement display system of the present invention.
Figure 2:
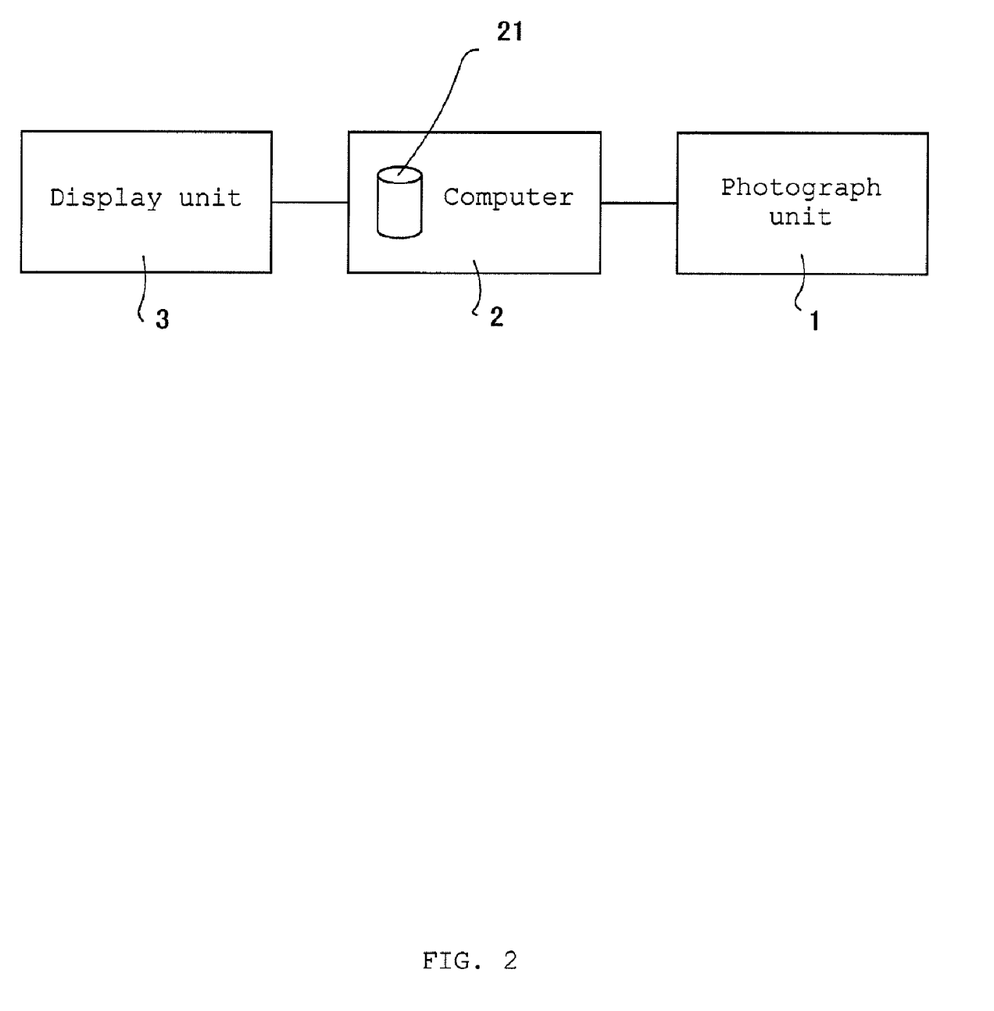
FIG. 2 A schematic view showing a configuration of the advertisement display system of the present invention.
Figure 3:
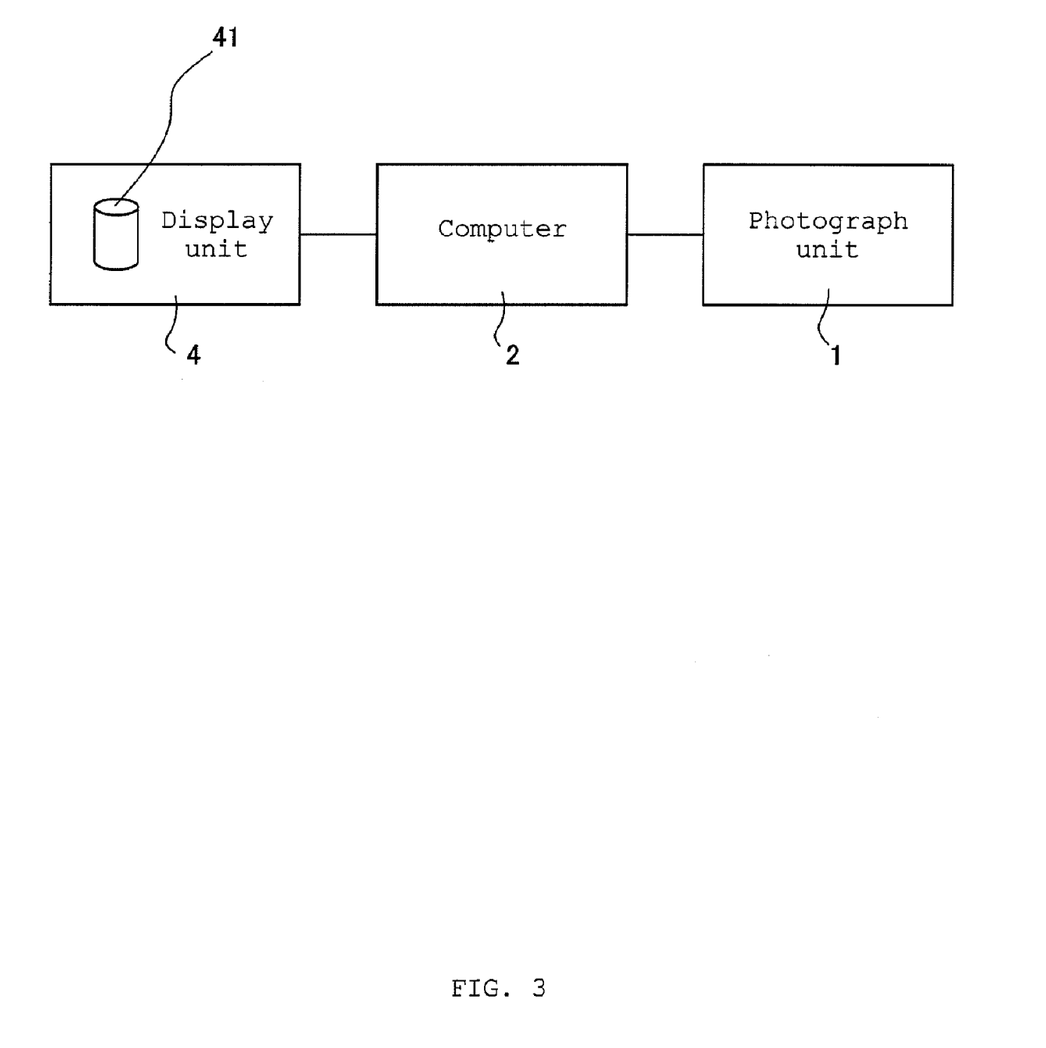
FIG. 3 A schematic view showing a configuration of the advertisement display system of the present invention.
Figure 4:
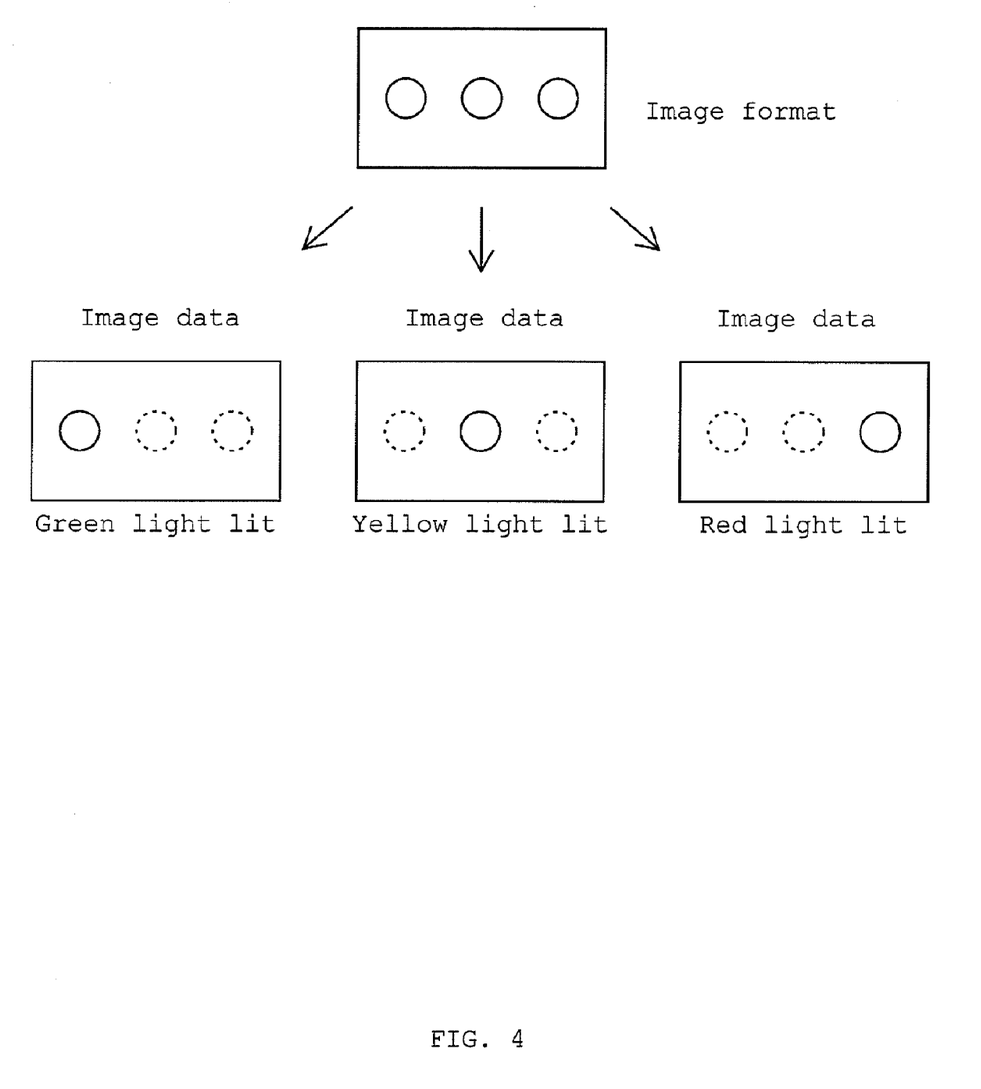
FIG. 4 A schematic view showing a condition of a traffic signal to be analyzed by the advertisement display system of the present invention.
Figure 5:
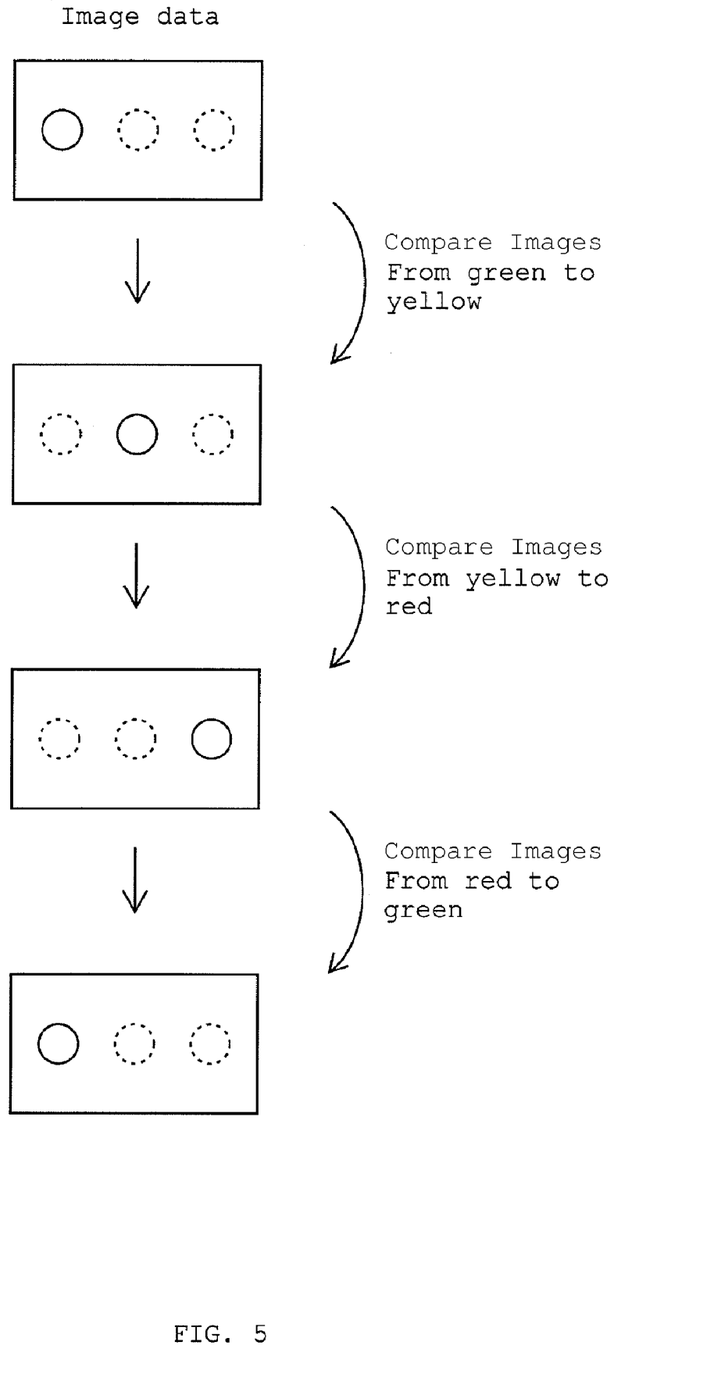
FIG. 5 A schematic view showing a condition of a traffic signal to be analyzed by the advertisement display system of the present invention.
Figure 6:
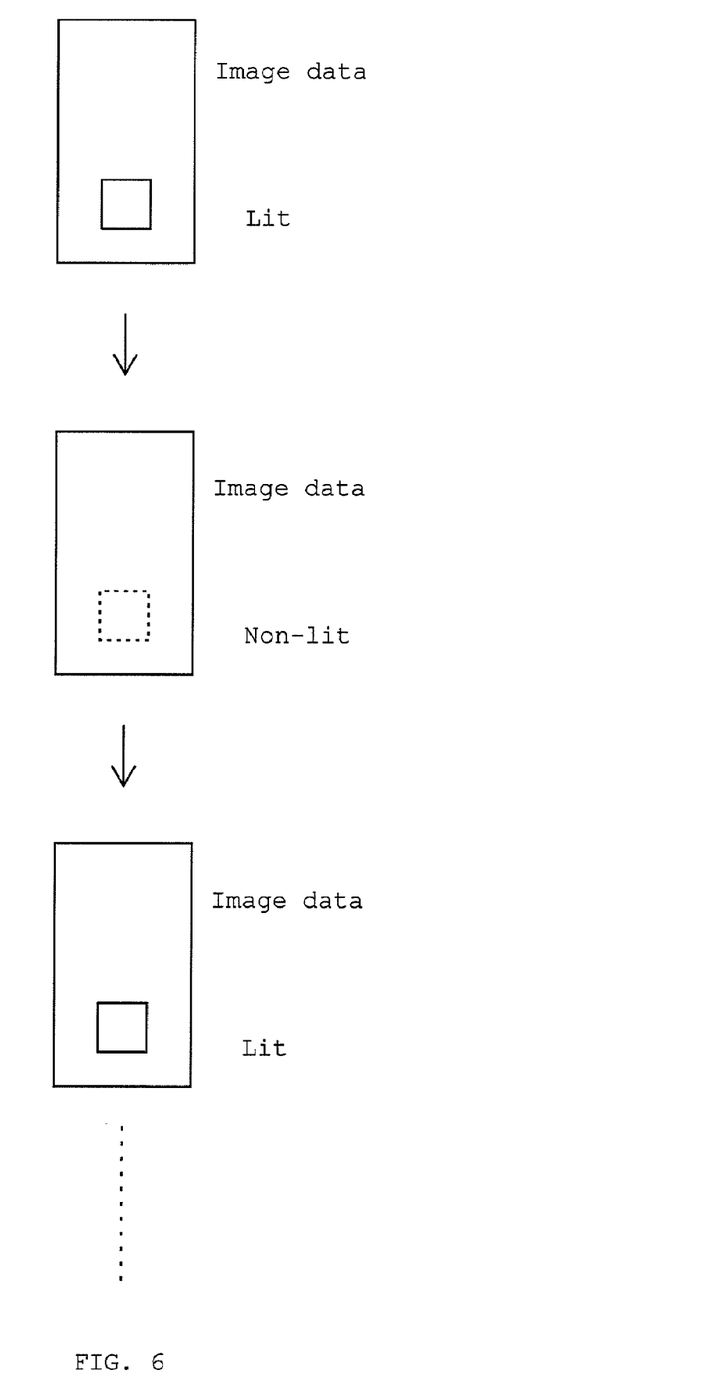
FIG. 6 A schematic view showing a condition of a traffic signal to be analyzed by the advertisement display system of the present invention.
Figure 7:
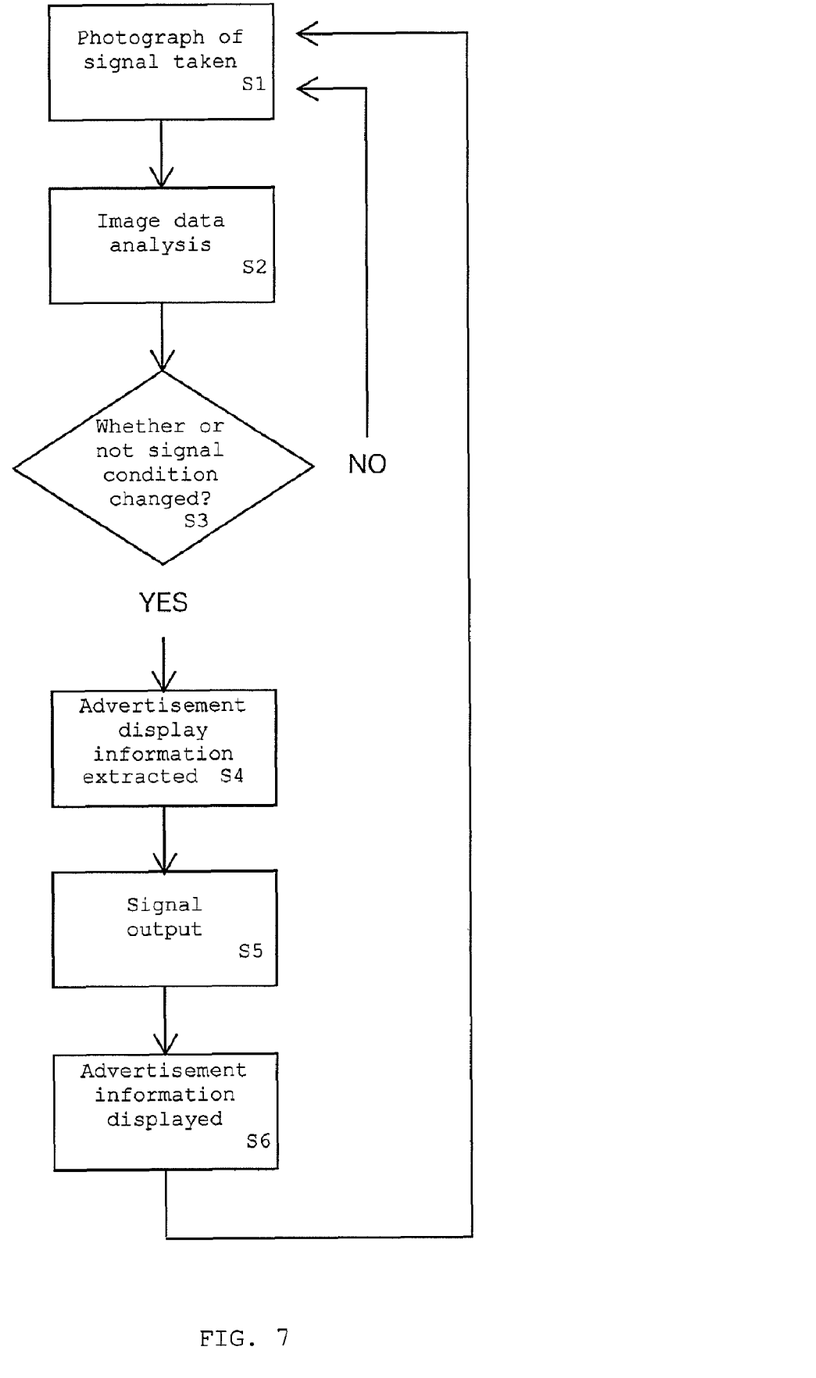
FIG. 7 A flowchart showing a usage condition of the advertisement display system of the present invention.
Figure 8:
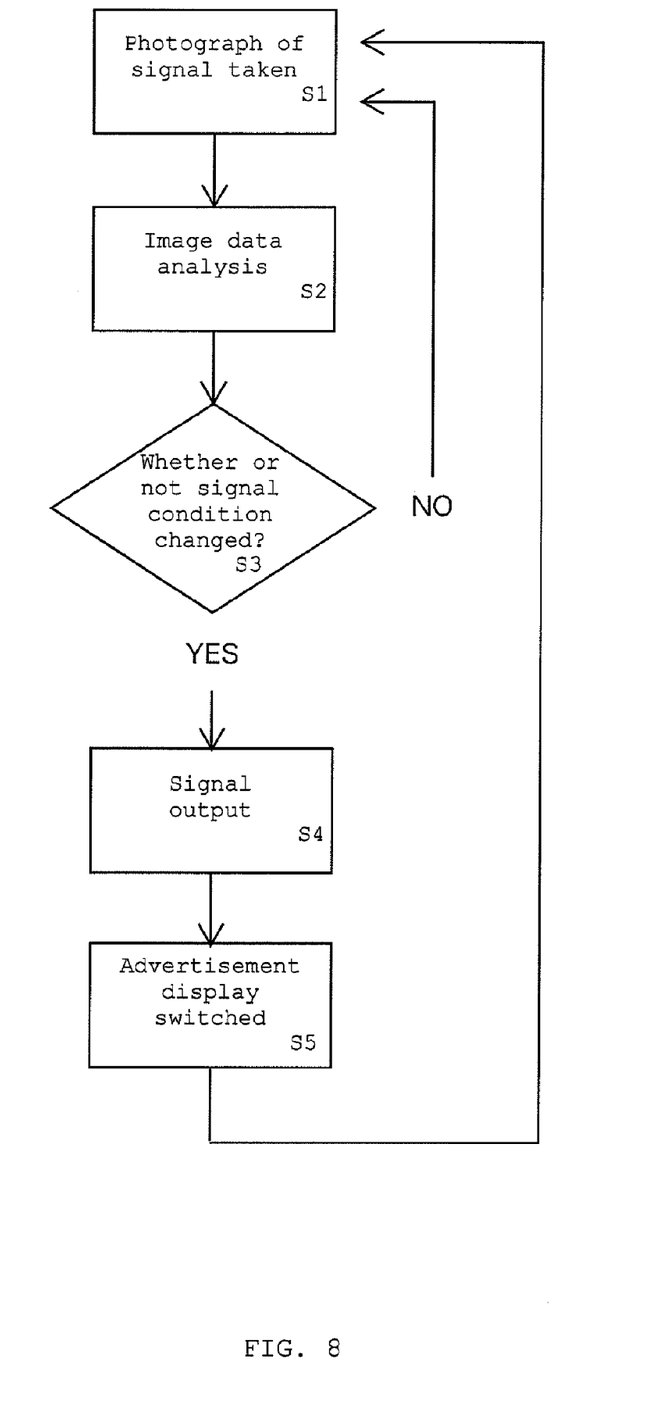
FIG. 8 A flowchart showing a usage condition of the advertisement display system of the present invention.

FIG. 1 is a view showing a usage condition of an advertisement display system of the present invention, FIG. 2 is a system configuration diagram of a first embodiment of the advertisement display system of the present invention, FIG. 3 is a system configuration diagram of a second embodiment of the advertisement display system of the present invention, FIGS. 4 to 6 are views showing conditions of a traffic signal analyzed by the advertisement display system of the present invention, FIG. 7 is a flowchart of the first embodiment of the advertisement display system of the present invention, and FIG. 8 is a flowchart of the second embodiment of the advertisement display system of the present invention.

As shown in FIGS. 1 to 3, the first and second embodiments of the advertisement display system of the present invention include a photograph unit 1 for taking a photograph of a signal condition of a traffic signal 5, a computer 2 as a detection means, which is enabled to communicate with the photograph unit 1 by a wired or a wireless line 22, for obtaining and analyzing an image taken by the photograph unit 1 and for controlling advertisement display, and a display unit 3 which is enabled to communicate with the computer 2 by a wired or a wireless line 23.

It is assumed that the traffic signal 5 which is to be photographed by the photograph unit 1 of the advertisement display system includes a generally known traffic signal for a vehicle 51 having a green light 52 indicating "go straight, turn left, or turn right", a yellow light 53 indicating "do not go beyond the stopping position, except for a case where you cannot safely stop because your vehicle is in the vicinity of the stopping position when the yellow light was lit", and a red light 54 indicating "do not go beyond the stopping position."

It is assumed that a traffic signal for a pedestrian 55 which carries out an operation symmetrical to the traffic signal for a vehicle 51 includes a green light 56 indicating "you can walk" when lit and indicating "do not start walking and those who are crossing the intersection must quickly cross it or stop crossing and return" when blinking, and a red light 57 indicating "you should not walk." Moreover, for an alarm for a railway crossing (not shown) to be photographed by the photograph unit 1 of the advertisement display system, generally known one having a red light which blinks when a train passes is assumed.

The advertisement display system of the first embodiment of the present invention has a following configuration: An advertisement display information to be displayed on the display unit 3 is stored in the computer 2 and an image data taken by the photograph unit 1 is analyzed by the computer 2; a display body data as the advertisement display information is extracted from a database 21 on the basis of the analyzed signal condition; and the display body data is output to the display unit 3 to control advertisement display by the display unit.

The photograph unit 1 is a digital camera or a video camera for taking an image which can take a photograph of the signal condition of the traffic signal 5 with a certain time interval and is provided at a location from which the signal condition of the traffic signal 5 in the vicinity of an intersection 8 can be taken, for example, top of a building 9 or an external wall thereof.

The photograph unit 1 includes various parts such as a body, a lens, and a light receiving element, and generates a digital image data of the signal condition of the traffic signal 5 by use of an optical sensor such as CCD or CMOS to transmit the image data to the computer 2 via the line 22.

The computer 2 includes an analysis part for analyzing the image data transmitted from the photograph unit 1 and a control part for controlling a display body to be displayed on the display unit 3 and in the first embodiment of the present invention, stores patterns of advertisement information to be displayed on the display unit 3 in the database 21. Here, it is not limited to the computer 2 where the database is stored and the database may be stored in another server unit as long as the database can be accessed by the computer 2 or the display unit 3.

The analysis part analyzes the image data which photographed the signal condition of the traffic signal 5 transmitted from the photograph unit 1. There are several methods for analysis and the analysis method may be, for example, one to detect a color of the lit signal lights of green, yellow, and red for the case of the traffic signal for a vehicle 51 and to detect a color of the lit signal lights of green and red for the case of the traffic signal for a pedestrian 55.

Moreover, as shown in FIG. 4, a method of analyzing which signal light of the traffic signal 5 is being lit on the basis of a position information format of each signal light of the traffic signal 5 loaded in the computer 2 in advance may be used. This analysis method is suitable for accurately analyzing which signal light is being lit and which signal light is not being lit and to carry out advertisement display control.

Further, as shown in FIG. 5, a method of comparing the image data of signal light in a first condition and the image data of signal light in a second condition which were photographed with a predetermined period or several seconds of time interval to analyze which signal light is being lit from the difference in signal light being lit between image data may be used. This analysis method does not require the position information format which is stored in advance and is suitable for carrying out advertisement display control by forecasting a third condition such as forecasting the change of signal light to red.

Further, as shown in FIG. 6, a method of analyzing lighting and non-lighting (null) of a signal light in the image data may be used. This analysis method is especially suitable for analyzing the signal condition of the traffic signal for a pedestrian 55 or the alarm for a railway crossing (not shown) and in a case where the green light 56 is recognized, it is analyzed that green light is lit while in a case where the green light 56 is not recognized, it is analyzed that red light is lit. In a case where lighting condition and non-lighting condition of the green light 56 are repeated in image data photographed with a short period of time interval of one second or less, it is analyzed that the green light 56 is blinking.

Here, analysis by timing measurement may be combined with the above-mentioned analysis of the signal condition by image analysis to control the advertisement display more highly accurately. That is, on the basis of time format which is from the start of lighting to the end of lighting of the red light 54 of the traffic signal 5, in other words until start of lighting of the green light 52, loaded in the computer in advance or in the case of the traffic signal 5 having different lighting time depending on the time of the day, time format which is from the start of lighting to the end of lighting of the red light 54 of the traffic signal 5, in other words until start of lighting of the green light 52, calculated from the lighting time of the signal light in the previous time cycle, time when the green light 52 is lit is forecast analyzed.

By combining these analysis methods, for example, it becomes possible to carry out highly accurate and precise control of advertisement display such as prompting a driver to make a preparation by outputting "Signal turning to green light soon" on the display unit several seconds before the green light 52 is lit at which the red light 54 is being lit in the actual traffic signal for a vehicle 51. It is also possible to control the advertisement display by combining other factors such as weather in addition to the analysis by timing measurement.

Display body data as the advertisement display information is stored in the database 21. There are cases where the display body data is advertisement display information content itself which is to be displayed on the display unit 3 and where the display body data is matrix information controlling the lamp of the display unit 3 to be lit. A plurality of patterns for carrying out advertisement display to each of viewers such as a pattern A for a vehicle passing by, a pattern B for a vehicle stopping, a pattern C for a pedestrian walking, and a pattern D for a pedestrian stopping are stored as the display body data. At this time, since the pattern A and the pattern C are advertisement information for viewers passing by, it is preferable that these patterns are advertisement information data having small information amount in a short period of time while the pattern B and the pattern D are advertisement information for viewers stopping, it is preferable that these patterns are advertisement information data having larger amount of information in a longer period of time compared to the pattern A and the pattern C.

Here, the advertisement information of the pattern A and the pattern C and the pattern B and the pattern D may have the same content or each pattern may have different and unique advertisement information. Moreover, various display patterns such as "Signal turning to green light soon" to be displayed several seconds before the green light 52 is lit or "Brake earlier" on a rainy day may be stored as the display body data.

The control part extracts patterns to be displayed from the various types of patterns of the display body data stored in the database on the basis of a program structured in advance depending on the signal condition of the traffic signal analyzed by the analysis part and extracts a pattern to be output on the basis of, for example, a flag supplied to each pattern in advance for each of the signal conditions so that the pattern is output to the display unit 3 via the line 23.

For example, if the signal condition that the green light 52 of the traffic signal for a vehicle 51 is lit is recognized, the pattern A of the advertisement information correlated with the signal condition is extracted from the database and the pattern A thus extracted is output as a signal to the display unit 3. On the other hand, if the signal condition that the red light 54 of the traffic signal for a vehicle 51 is lit is recognized, the pattern B of the advertisement information correlated with the signal condition is extracted from the database and the pattern B thus extracted is output as a signal to the display unit 3. Moreover, if a condition that the red light 54 is being lit, which is X seconds before the green light is lit, is recognized, a display pattern for preparation of start of a vehicle is output.

A signal to be output differs depending on the type of the display unit 3. In a case where the display unit 3 is an electric display, a matrix information controlling a lamp is output as a signal and in a case where the display unit 3 is an image display monitor or a projector, advertisement display information content such as a still image or a moving image stored in advance is output as a signal.

The display unit 3 is a display unit for outputting an advertisement display on the basis of the signal output from the computer 2, which is an electric display for outputting an image or a letter by blinking of an LED lamp or the like, or an image display monitor or a projector for displaying a digital content such as a still image or a moving image output from the computer. The display part of the display unit 3 is provided on a location where the display part faces a vehicle 6 or a pedestrian 7 at the intersection and is attached to, for example, an external wall or the top of a building 9, a street light, a signboard, or the like.

The display body 31 to be displayed on the display unit 3 is controlled and switched by an output signal transmitted from the computer 2. For example, when the red light 54 of the traffic signal for a vehicle 51 is being lit, various types of advertisement such as an advertisement of a parking lot are displayed on the display unit 3 provided in a position which can be seen by a driver of the vehicle 6 and a word of "Walk" is displayed on a display unit for the pedestrian 7 (not shown).

Next, when the green light 52 of the traffic signal for a vehicle 51 is being lit, words of "Traffic safety" is displayed on the display unit 3 provided in a position which can be seen by a driver of the vehicle 6 and an advertisement list including various types of advertisement such as an advertisement of a supermarket or an amusement facility near the intersection is displayed on the display unit for the pedestrian 7 (not shown). Thus, the display units 3 are provided at T-intersection, a crossroad, and a multi-forked road depending on the type of road in respective directions so that the display bodies 31 of the display units 3 have advertisement display with contents suitable for viewers in each position.

Usage condition of the advertisement display system of the first embodiment will be shown based on FIG. 7. The photograph unit 1 takes photographs of the signal condition of the traffic signal 5 by a certain time interval, preferably by a time interval of one second or less, and transmits the image data to the computer 2 (S1).

The computer 2 analyzes change in the signal condition from the image data transmitted from the photograph unit 1 (S2). If it is not analyzed that there is a change in the signal condition, the above-mentioned operation is repeated. However, if it is analyzed that there is a change in the signal condition (S3), an advertisement display information corresponding to the signal condition is extracted from the database 21 (S4) and the advertisement display information is output as a signal to the display unit 3 (S5).

The display unit 3 displays the advertisement display information transmitted from the computer 2 and retains the display condition until the next advertisement display information is transmitted (S6). These operations are correlated with the change in signal condition of the traffic signal 5 and repeated.

An advertisement display system of a second embodiment of the present invention is a case where a display body data to be displayed on a display unit 4 is stored in the display unit 4 and an image data taken by the photograph unit 1 is analyzed by the computer 2 and based on the analyzed signal condition, a display body data is output to the display unit 4 to control the advertisement display on the display unit. Here, configuration of the photograph unit 1 and configuration of analysis part of the computer 2 are similar to those in the advertisement display system of the first embodiment of the present invention and therefore explanation thereof is omitted here.

The simplest configuration of the display unit 4 is a display unit in which a sheet where a display body such as an advertisement information content is displayed is supported in a slidable manner toward a frame-shaped window. A display body as an advertisement display information is displayed by printing or the like on the strip-shaped sheet. A plurality of patterns of display body such as a pattern A that is an advertisement information data for a vehicle passing by, a pattern B for a vehicle stopping, a pattern C for a pedestrian walking, and a pattern D for a pedestrian stopping are printed as the display body and the advertisement information contents seen through the window is switched by rolling up and out by an axis rod which supports the sheet.

Here, the advertisement information of the pattern A and the pattern C and information of the pattern B and the pattern D may have the same content or each pattern may have different and unique advertisement information. Moreover, various display patterns such as "Signal turning to green light soon" to be displayed several seconds before the green light 52 is lit or "Brake earlier" on a rainy day may be displayed.

The control part outputs a display body switching signal to the display unit 4 via the line 23 depending on the signal condition of the traffic signal analyzed by the analysis part on the basis of a program structured in advance. The display body switching signal may be a simple output signal for instructing roll-out of the display body printed next to the present display body or may be an output signal including a roll-out sheet number or a sheet width for rolling out X sheets with the present sheet as an operating point.

For example, if the computer 2 recognizes a signal condition where the green light 52 of the traffic signal for a vehicle 51 is being lit, a signal is output to the display unit 4 so that a pattern A including an advertisement information correlated with the signal condition is displayed. On the other hand, if the computer 2 recognizes a signal condition where the red light 54 of the traffic signal for a vehicle 51 is being lit, a signal is output to the display unit 4 so that a pattern B including an advertisement information correlated with the signal condition is displayed. Moreover, if the computer 2 recognizes a condition that the red light 54 is being lit, which is X seconds before the green light is lit, a signal is output to the display unit 4 so that a display pattern for preparation for start of a vehicle is displayed and the display unit 4 carries out rolling up and out of the axis rod on the basis of the signal from the computer 2.

Moreover, as another aspect of a display unit, there is a display unit which switches the display content by rotating a polygonal column on which display bodies such as advertisement information are displayed. As this type of display unit, there is one which rotates the polygonal column and on each surfaces of the polygonal column, different display bodies are displayed.

A plurality of polygonal columns such as triangle prisms called louver are provided for this display unit. Parts of the display bodies are displayed on each of side surfaces of the polygonal columns so that one display body can be displayed with the whole of one side surfaces of the columns and then, the polygonal columns are rotated simultaneously to display a plurality of types of display bodies with one display space. In such louver type display unit which switches the display content by rotating the polygonal columns, the polygonal columns are rotated on the basis of a signal from the computer 2.

Here, in the second embodiment described above, an example of a simple configuration where a database 41 is provided in the display unit 4 is shown. However, in a case where the display unit 4 is an electric display, matrix information for controlling the LED to be lit may be stored as a database and in a case where the display unit 4 is an image display monitor, the advertisement display information content may be stored as a database. In this case also, the advertisement information content is switched by the display body switching signal from the computer 2.

A usage condition of the advertisement display system of the first embodiment will be shown based on FIG. 8. The photograph unit 1 takes photographs of the signal condition of the traffic signal 5 with a certain interval, preferably time interval of one second or less, and transmits the image data to the computer 2 (S1).

The computer 2 analyzes change in the signal condition from the image data transmitted from the photograph unit 1 (S2). If it is not analyzed that there is a change in the signal condition, the above-mentioned operations are repeated. However, if it is analyzed that there is a change in the signal condition (S3), a display body switching signal is output to the display unit 4 (S4).

The display unit 4 displays the display body such as the advertisement display information in the database 41 on the basis of the display body switching signal transmitted from the computer 2 and retains the display condition until the next display body switching signal is transmitted (S5). These operations are correlated with the change in the signal condition of the traffic signal 5 and repeated.

The display body thus displayed on the display unit 4 is controlled and switched by the output signal transmitted from the computer 2. For example, when the red light 54 of the traffic signal for a vehicle 51 is being lit, various advertisements such as auto supplies or a new vehicle are displayed on the display unit 4 provided in a position viewable from the driver of the vehicle 6 while a word of "Walk" is displayed on a display unit for the pedestrian 7 (not shown).

Next, when the green light 52 of the traffic signal for a vehicle 51 is being lit, words of "Traffic safety" are displayed on the display unit 4 provided in a position viewable from the driver of the vehicle 6 and an advertisement list including various types of advertisement such as an advertisement of a TV drama or an introduction of a commercial goods is displayed on the display unit for the pedestrian 7 (not shown). Thus, the display units 4 are provided at T-intersection, a crossroad, and a multi-forked road depending on the type of road so that the display bodies of the display units 4 have advertisement display with contents suitable for viewers in each position.

Here, the display unit is not limited to the above-mentioned image display monitor, electric display, projector, and each of the above-mentioned display unit but any type of display unit may be used as long as change of the display body content caused by the signal from the computer 2 can be carried out.

Figure 9:
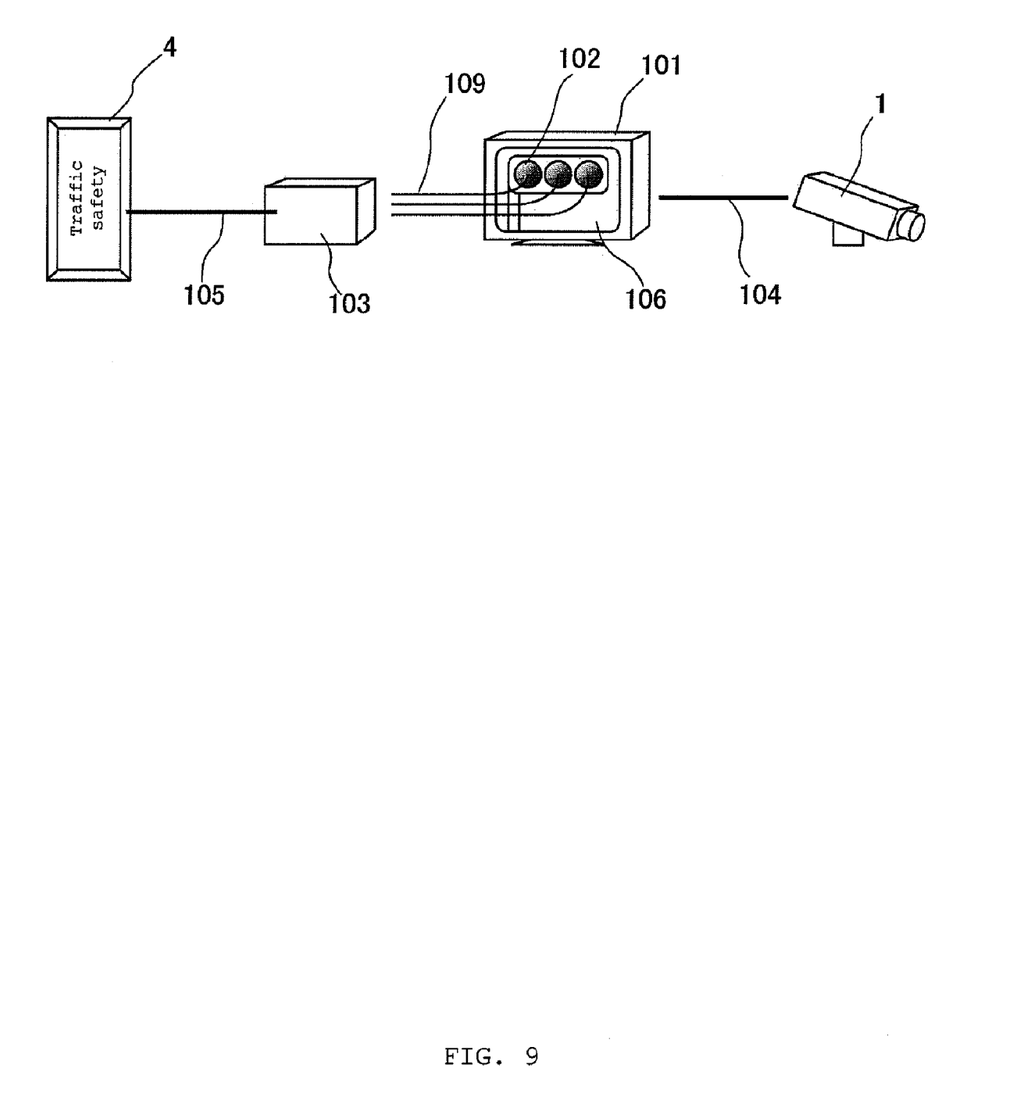
FIG. 9 A schematic view showing a configuration of the advertisement display system of the present invention.
Figure 10:
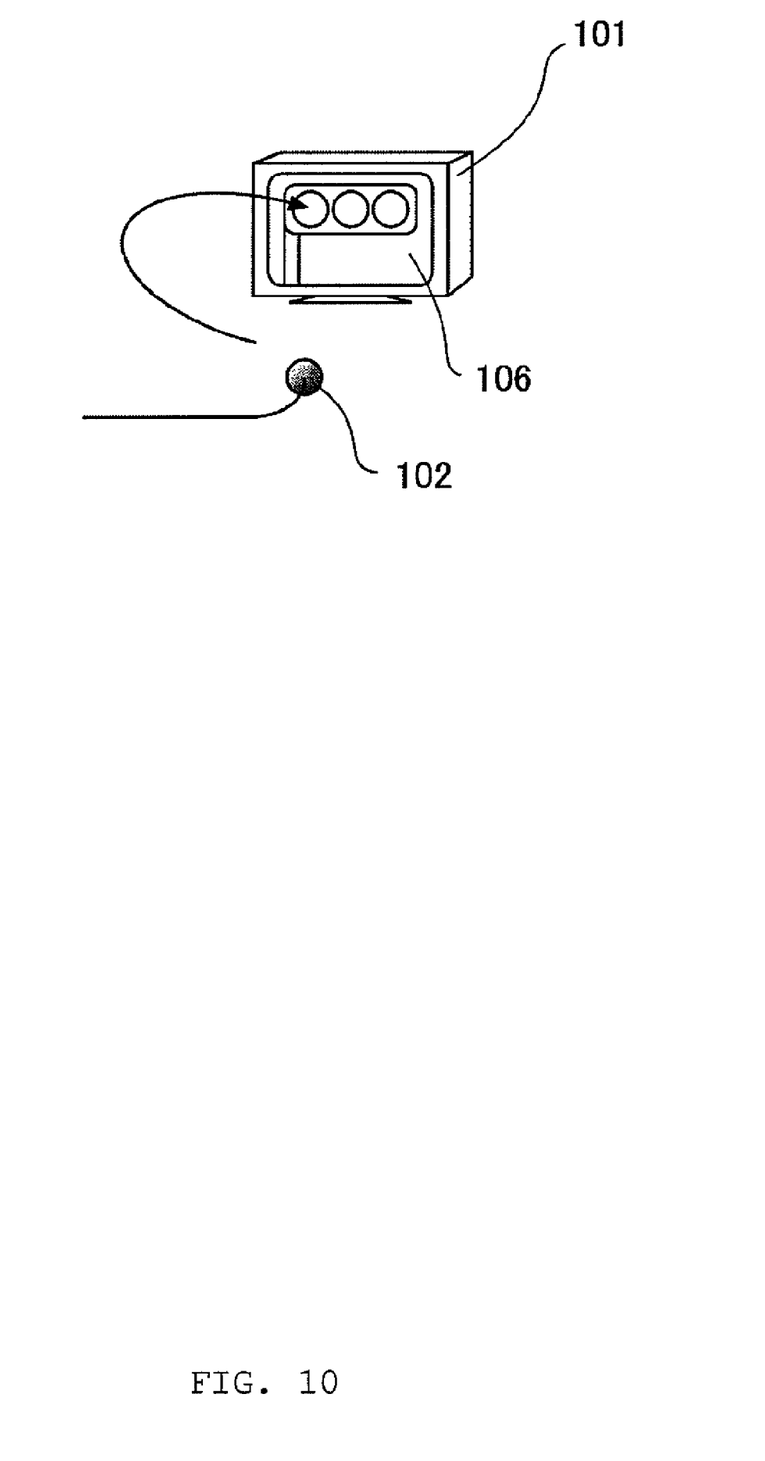
FIG. 10 A schematic view showing a configuration of an image display unit.
Figure 11:
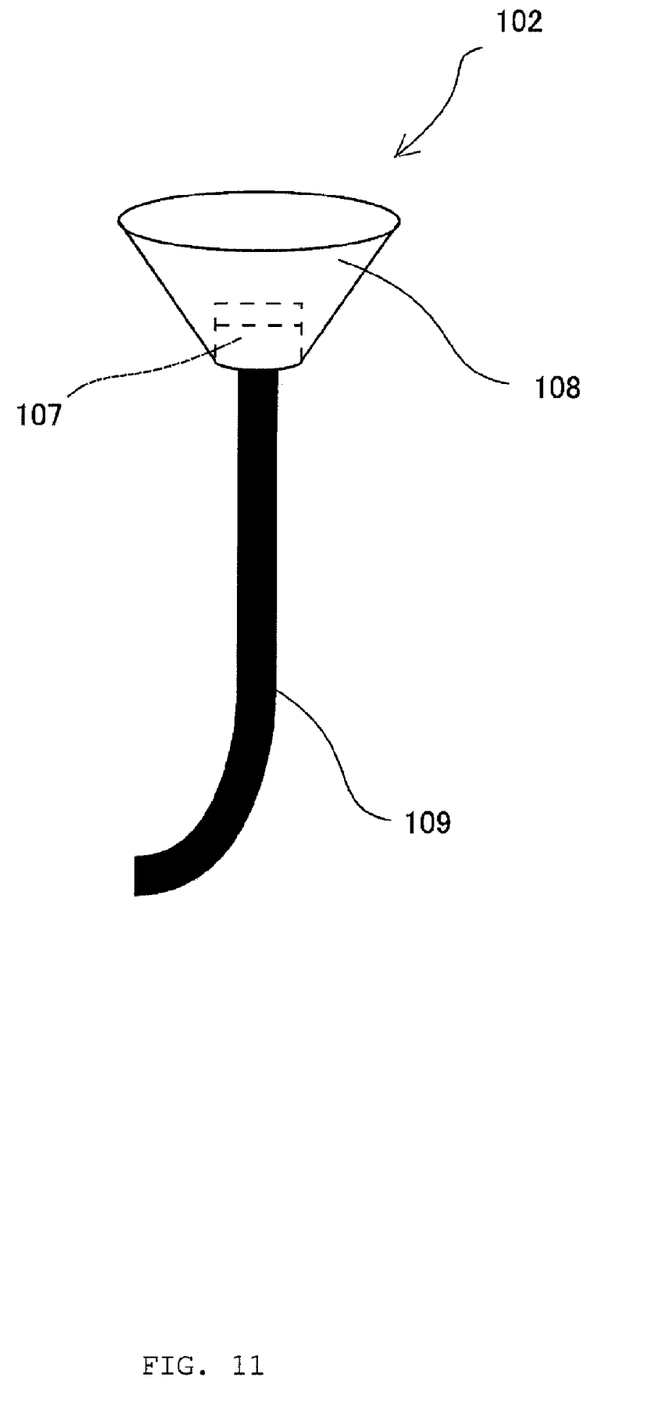
FIG. 11 A schematic view showing a configuration of an optical sensor.

FIG. 9 is a view showing a system configuration of a third embodiment of the present invention, FIG. 10 is a view of an image display unit used in the third embodiment of the present invention, and FIG. 11 is a view of an optical sensor used in the third embodiment of the present invention.

As shown in FIG. 9, the advertisement display system of the third embodiment of the present invention includes the photograph unit 1 for taking a photograph of the signal condition of a signal, an image display unit 101 and an optical sensor 102 as detection means, a relay unit 103 connected with the optical sensor 102, and the display unit 4 connected with the relay unit 103. Here, configuration of the photograph unit 1 and configuration of the display unit 4 are similar to those in the second embodiment of the present invention and therefore explanation thereof is omitted here.

As shown in FIG. 10, the image display unit 101 is connected with the photograph unit 1 by a cable 104, can display an image of the signal light taken by the photograph unit 1, and includes a screen 106 for displaying the image.

As shown in FIG. 11, the optical sensor 102 includes an optical sensor part 107 and a shield material 108 which is provided so as to surround the periphery of the optical sensor part 107 to block light from outside for prevention of a detection error by the optical sensor part 107. The optical sensor part 107 includes an optical detection element for detecting change in a light of an image displayed on a screen 106 of the image display unit 101. The shield material 108 includes a light blocking material and is provided so as to cover the optical sensor part 107 in a funnel-shaped manner.

The optical sensor 102 detects lighting, color, and blinking condition of a signal light displayed on the image display unit 101 and outputs an electric current to the relay unit 103 via a cable 109.

The relay unit 103 outputs a display body switching signal to the display unit 4 for control in response to the change in the electric current output from the optical sensor 102.

In the advertisement display system of the third embodiment of the present invention, the optical sensor 102 is attached to the screen 106 of the image display unit 101, at least part of the image displayed on the screen 106 is detected by the optical sensor 102, and an advertisement display information stored in the display unit 4 is displayed on the display unit 4 by the relay unit 103.

In the advertisement display system of the present embodiment, optical sensors 102 are attached to spots which correspond to display positions of each signal light displayed on the screen 106 and if the optical sensor part 107 of the optical sensor 102 detects lighting of the signal light displayed on the screen 106, a signal is output to the display unit 4 so that the display body to be displayed on the display unit 4 is switched. That is, for a traffic signal for a vehicle, a total of three optical sensors 102 are attached to positions corresponding to green light, yellow light, and red light and the optical sensor part 107 of the optical sensor 102 detects lighting and non-lighting or changes in color of the signal light displayed on the screen 106 of the image display unit 101.

A usage condition of the advertisement display system of the third embodiment will be shown. The photograph unit 1 takes photographs of the traffic signal 5 with a certain interval, preferably time interval of one second or less, and the image display unit 101 displays images thus taken on the screen 106.

The optical sensor part 107 of the optical sensor 102 attached to the screen 106 detects lighting of the signal light displayed on the screen 106 and outputs an electric current to the relay unit 103. The relay unit 103 converts the change in the electric current from the optical sensor 102 into the display body switching signal and outputs the signal to the display unit 4.

The display unit 4 displays the display body such as an advertisement display information in the database 41 on the basis of the display body switching signal transmitted from the relay unit 103 and retains this condition until the next display body switching signal is transmitted. These operations are correlated with the change in the signal condition of the traffic signal 5 and repeated.

The display body thus displayed on the display unit 4 is controlled and switched by the output signal transmitted from the relay unit 103. For example, when the red light 54 of the traffic signal for a vehicle 51 is being lit, various advertisements such as auto supplies or a new vehicle are displayed on the display unit 4 provided in a position viewable from the driver of the vehicle 6 while a word of "Walk" is displayed on a display unit for the pedestrian 7 (not shown).

Next, when the green light 52 of the traffic signal for a vehicle 51 is being lit, words of "Traffic safety" are displayed on the display unit 4 provided in a position viewable from the driver of the vehicle 6 and an advertisement list including various types of advertisement such as an advertisement of a TV drama or an introduction of a commercial goods is displayed on the display unit for the pedestrian 7 (not shown). Thus, the display units 4 are provided at T-intersection, a crossroad, and a multi-forked road depending on the type of the road so that the display bodies of the display units 4 have advertisement display with contents suitable for viewers in each position.

Here, the display unit is not limited to the above-mentioned image display monitor, electric display, projector, and each of the above-mentioned display units but any type of display unit may be used as long as change of the display body content caused by the signal from the relay unit 103 can be carried out.

Moreover, advertisement display systems correlated with the signal of a traffic signal in an intersection were explained in the above-mentioned three embodiments. However, the system can be applied to an advertisement display system correlated with the signal condition of an alarm for a railway crossing as mentioned above.

Photographs of a red light of the alarm for a railway crossing when a train passes by is taken by a photograph unit and blinking and non-blinking of the red light is detected and analyzed by a computer or an optical sensor from the image data thus taken by the photograph unit so that an advertisement is displayed on a display unit for a period during which the red light is blinking, that is, during which a train passes, and display content is synchronized with the non-blinking of the red light to switch the display content. Thus, it becomes possible to carry out advertisement display when a train passes by.

It becomes possible to effectively show an advertisement having a content, time, and amount of information correlated with the signal condition of the signal to a viewer and therefore to carry out advertisement display having high advertising effectiveness. Moreover, it becomes possible to carry out display with smaller information amount or display suitable for traffic safety to the drivers or pedestrians passing while it becomes possible to carry out display with greater amount of information to viewers waiting for the signal. Therefore, traffic safety-conscious advertisement display can be carried out.

What is claimed is:

1. An advertisement display system comprising:
a photograph unit that obtains image data of one or more signal lights of a signal, the signal being a traffic signal or an alarm for a railway crossing;
an image display unit that displays the image data of the one or more signal lights of the signal obtained by the photograph unit,
an optical sensor that detects a change in lighting, a change in color, or a blinking condition of the one or more signal lights of the signal as a signal condition of the signal based on the image data of the one or more signal lights of the signal displayed on the image display unit, the optical sensor being attached to a screen of the image display unit;
a relay unit connected to the optical sensor; and
an advertisement display unit that (i) is viewable from the street, (ii) communicates with the relay unit to obtain the signal condition detected by the optical sensor, (iii) extracts advertisement display information based on a correlation between the extracted advertisement display information and the signal condition of the signal light detected by the optical sensor, and (iv) displays the extracted advertisement display information.

2. The advertisement display system according to claim 1, wherein the photograph unit is a digital camera or a digital video camera which can take a digital image, and
wherein the image data obtained by the photograph unit is a plurality of digital images taken by the photograph unit.

3. The advertisement display system according to claim 1, wherein the advertisement display information is either advertisement display content information or matrix information for controlling lighting of a lamp.

4. The advertisement display system according to claim 1, wherein the advertisement display unit is any one of an image display monitor, an electric display, a projector, a display unit having a sheet on which a display body is displayed and capable of being slid into a frame shaped window, and a display unit which changes display content by rotating a polygonal column on which the display body is displayed.

* * * * *